US009009352B1

United States Patent
Yee et al.

(10) Patent No.: US 9,009,352 B1
(45) Date of Patent: Apr. 14, 2015

(54) TRANSFORMATION OF COMMON INFORMATION MODEL MESSAGES

(75) Inventors: YinKee Yee, Newark, CA (US); Sergey A. Razin, Columbia, SC (US); Yicang Wu, Shanghai (CN); Kai Chen, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 114 days.

(21) Appl. No.: 13/432,522

(22) Filed: Mar. 28, 2012

(51) Int. Cl.
G06F 15/16 (2006.01)
H04L 12/58 (2006.01)

(52) U.S. Cl.
CPC ............ H04L 12/5835 (2013.01); H04L 12/58 (2013.01)

(58) Field of Classification Search
CPC ..... H04L 12/585; H04L 12/58; H04L 12/581; H04L 12/5855; H04L 51/00; H04L 51/06; H04L 51/24; H04L 51/36; H04L 29/08072; H04L 29/06
USPC .......................... 709/204, 205, 206, 230, 246
See application file for complete search history.

(56) References Cited

U.S. PATENT DOCUMENTS

| 7,890,622 | B2 * | 2/2011 | Coca et al. | 709/224 |
|---|---|---|---|---|
| 2007/0226232 | A1 * | 9/2007 | Yin et al. | 707/100 |
| 2010/0250746 | A1 * | 9/2010 | Murase | 709/226 |
| 2011/0125854 | A1 * | 5/2011 | Macken | 709/206 |
| 2011/0145320 | A1 | 6/2011 | Megginson | |
| 2011/0307443 | A1 | 12/2011 | Megginson | |
| 2011/0307543 | A1 * | 12/2011 | Megginson | 709/203 |
| 2012/0023418 | A1 * | 1/2012 | Frields et al. | 715/756 |
| 2012/0063354 | A1 * | 3/2012 | Vanga et al. | 370/254 |

OTHER PUBLICATIONS

CIM Schema, Version 2.29.0, May 3, 2011, 3922 pages.
Distributed Management Task Force, Inc. (DMTF), "Common Information Model (CIM) Infrastructure," Document No. DSP0004, Version 2.6.0, Mar. 2010, 186 pages.
U.S. Appl. No. 13/170,345, filed in the name of Juels et al. on Jun. 28, 2011 and entitled "Service Window Optimized System Alert Engine."

* cited by examiner

Primary Examiner — Dhairya A Patel
(74) Attorney, Agent, or Firm — Ryan, Mason & Lewis, LLP

(57) ABSTRACT

A common information model (CIM) message received in a processing device of an information processing system is transformed to a message in a designated message queuing protocol format, such as an advanced message queuing protocol (AMQP) message format. The transformed message is then posted or otherwise provided to a message queuing protocol server. The CIM message may comprise, for example, a CIM notification received in a CIM client from a CIM server, responsive to an indication subscription from the CIM client. The transformation of the CIM message to the message in the designated message queuing protocol format may more particularly involve, for example, transforming a CIM notification associated with the CIM message to a CIM instance object, transforming the CIM instance object to an alerting object, and transforming the alerting object to an AMQP message. One or more of these operations may be performed in a CIM transform module.

20 Claims, 3 Drawing Sheets

US 9,009,352 B1

TRANSFORMATION OF COMMON INFORMATION MODEL MESSAGES

FIELD

Illustrative embodiments of the invention relate generally to messaging between elements of information technology infrastructure.

BACKGROUND

Information technology infrastructure of a company, organization or other enterprise may process information in a common information model (CIM) format. CIM is an open standard that provides common definitions of management information for use by systems, networks, applications, services and other infrastructure elements. It allows for implementation of product vendor extensions based on the common definitions, so as to facilitate the exchange of semantically-rich management information between a wide variety of information technology infrastructure elements.

The CIM standard, established by the Distributed Management Task Force, includes Infrastructure Specification and Schema portions. The Schema provides the actual model descriptions, while the Infrastructure Specification defines the details for integration with other management models. See CIM Schema Version 2.29.0, May 3, 2011, and CIM Infrastructure Specification, Version 2.6, Mar. 31, 2010, both of which are incorporated by reference herein. The CIM Schema is a conceptual schema which defines the specific set of objects and relationships between them that represent a common base for the managed elements in an information technology environment.

In accordance with the CIM standard, managed elements of the information technology infrastructure, including computer systems, operating systems, storage systems and middleware, are represented using a common set of objects as well as relationships between the objects. However, infrastructure product vendors may provide implementations of CIM in a variety of different forms. For example, each of these vendors may implement a different type of vendor-specific CIM indication services. This can create difficulties for product customers that attempt to integrate their own third-party management tools and other applications with one or more of the vendor-specific CIM indication services.

Accordingly, integration of products that include vendor-specific CIM indication services is particularly challenging under conventional practice, and can lead to excessive product integration costs. The situation is further complicated by the fact that an increasing number of enterprises are migrating portions of their information technology infrastructure to cloud service providers.

SUMMARY

Illustrative embodiments of the invention provide techniques for transforming CIM messages to messages in a message queuing protocol format, such as an advanced message queuing protocol (AMQP) format.

In one embodiment, a CIM message received in a processing device of an information processing system is transformed to a message in a designated message queuing protocol format, such as an AMQP format. The transformed message is then posted or otherwise provided to a message queuing protocol server. The CIM message may comprise, for example, a CIM notification received in a CIM client from a CIM server, responsive to an indication subscription from the CIM client.

By way of example, the transformation may more particularly involve transforming a CIM notification or other type of information associated with the CIM message to a CIM instance object, transforming the CIM instance object to an alerting object, and transforming the alerting object to an AMQP message.

One or more of the illustrative embodiments overcome the above-noted drawbacks of conventional practice. For example, the disclosed transformations allow CIM indications to be processed using AMQP middleware. As a result, transformation of CIM messages to AMQP messages facilitates integration of products that include vendor-specific CIM indication services, thereby significantly reducing product integration costs. The disclosed techniques are suitable for implementation in a wide variety of different types of information technology infrastructure, including virtual infrastructure of a cloud service provider.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
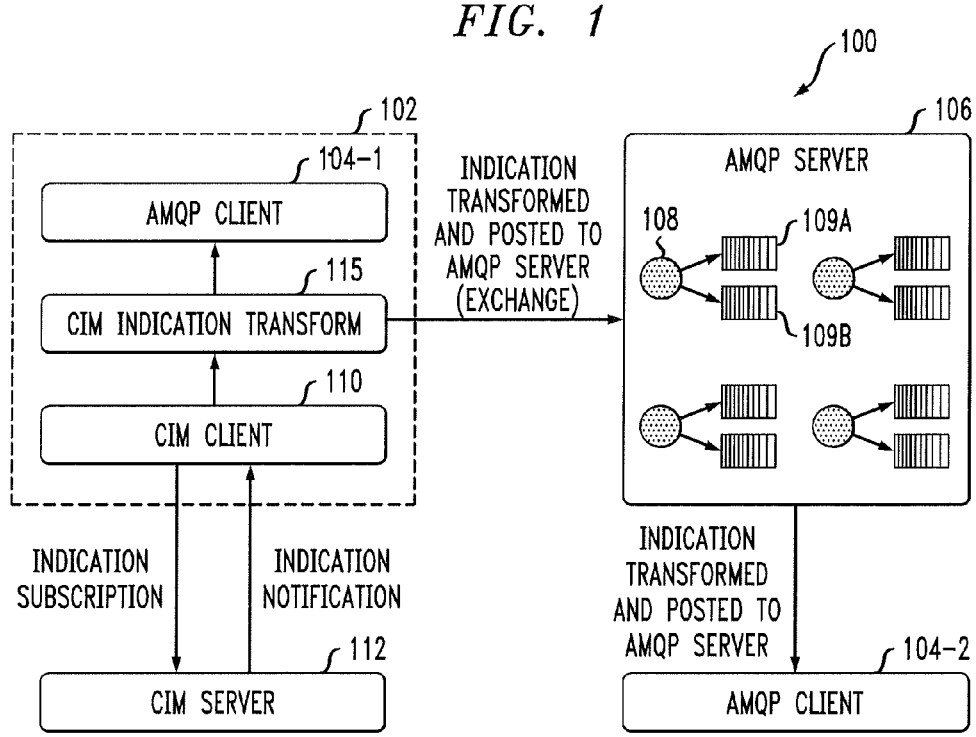
FIG. 1 is a block diagram of an information processing system that incorporates functionality for transformation of CIM indications to AMQP messages in an illustrative embodiment of the invention.

FIG. 1 shows an information processing system 100 configured with functionality for transformation of CIM indications to AMQP messages in an illustrative embodiment of the invention. The system 100 in this embodiment comprises a processing device 102, a plurality of AMQP clients 104-1 and 104-2, and an AMQP server 106. The AMQP server 106 illustratively comprises a plurality of exchanges 108 coupled to respective sets of queues 109A and 109B. Also included in the system 100 is a CIM client 110 which is implemented in the processing device 102 and communicates with a CIM server 112, and a CIM indication transform module 115, also implemented in the processing device 102, which is coupled between the CIM client 110 and the AMQP client 104-1.

In the present embodiment, the processing device 102 is generally configured to receive a CIM message, to transform the CIM message to a message in a designated message queuing protocol format which is illustratively an AMQP format, and to provide the transformed message to the AMQP server 106. The AMQP server 106 operates in accordance with the AMQP Specifications, Version 1.0, including one or more of Broker Behaviour Definition, Addressing Specification, Broker Management, JMS Mapping, WCF Mapping, Compatibility, and Distributed Transactions specifications, which are incorporated by reference herein. As indicated previously, other embodiments may utilize message queuing protocols other than AMQP.

The CIM message received and transformed by processing device 102 may be in any of a variety of different CIM formats. For example, the CIM message may comprise a CIM_XML HTTP message, or other type of CIM message. The transformed CIM message may comprise, for example, an XML/JSON message, where JSON denotes JavaScript Object Notation. Again, other messaging formats may be used in other embodiments.

The CIM message in the present embodiment is assumed to comprise an indication notification, although other types of CIM messages may be used in other embodiments. The indication notification is an example of what is more generally referred to herein as information associated with a CIM message. Such information may comprise, for example, the entire CIM message, one or more portions of the message, or additional or alternative information.

The CIM client 110 of the processing device 102 receives the indication notification from the CIM server 112 responsive to an indication subscription previously provided to the CIM server 112 by the CIM client 110.

The CIM indication transform module 115 is coupled between the CIM client 110 and AMQP client 104-1 in the processing device 102, and is also configured to communicate with the AMQP server 106. The CIM indication transform module 115 receives the indication from the CIM client 110, transforms the indication to a message in the designated message queuing protocol format, in this embodiment an AMQP message, and provides the transformed indication in an AMQP message to the AMQP server 106. This may more particularly involve, for example, posting the AMQP message comprising the transformed indication to the AMQP server 106.

By way of example, the CIM indication transform module 115 may be configured to receive information associated with the CIM message in a CIM instance object, to transform the CIM instance object to an alerting object, and to transform the alerting object to the AMQP message posted to the AMQP server 106. In transforming the CIM instance object to an alerting object, the CIM indication transform module 115 may transfer at least one property from the CIM instance object to the alerting object.

The CIM indication that was transformed and posted to the AMQP server 106 by the CIM indication transform module 115 may be directed to one of the messaging queues 109 under control of a corresponding one of the exchanges 108, for subsequent delivery to AMQP client 104-2.

The processing device 102 may be implemented in information technology (IT) infrastructure of a service provider or other enterprise. As a more particular example, the processing device may be implemented at least in part within virtual infrastructure of a cloud service provider. It may comprise a computer, server, mobile telephone or other type of processing device. Examples of IT infrastructure suitable for implementing the processing device 102 and other portions of the information processing system 100 will be described below in conjunction with FIGS. 3 and 4. Such IT infrastructure may comprise one or more processing platforms in which processing devices are configured to communicate with one another over a network.

Each such processing device generally comprises at least one processor and an associated memory, and implements one or more functional modules for controlling certain features of the information processing system 100. Multiple system elements may be implemented by a single processing device in a given embodiment. For example, one or more of the AMQP client 104-2, AMQP server 106 and CIM server 112 may also be implemented on the processing device 102. Alternatively, separate processing devices may be used to implement each of these system elements. The term "information technology infrastructure" as used herein is intended to be broadly construed so as to encompass these and numerous other arrangements of one or more processing devices.

It should be noted that the particular set of elements shown in FIG. 1 for implementing functionality for transformation of CIM indications to AMQP messages is presented by way of example, and in other embodiments additional or alternative elements may be used. Thus, another embodiment may include additional instances of one or more of elements 102, 104, 106, 110, 112 and 115. Also, one or more of these or other system elements may be implemented at least in part in the form of software. Such software is stored and executed utilizing respective memory and processor elements of at least one processing device.

In addition, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices.

The operation of the information processing system 100 will now be described in greater detail with reference to the flow diagram of FIG. 2, which illustrates a process for transformation of CIM indications to AMQP messages in the system. The process includes steps 200, 202 and 204 as shown. It is assumed that step 200 is performed by CIM client 110 and that steps 202 and 204 are performed by CIM indication transform module 115, although in other embodiments one or more such steps may be implemented at least in part by other system elements.

Also, it is assumed in this embodiment that the CIM message comprises a notification generated by a service window optimized system alert (SWOSA) engine of the type described in U.S. patent application Ser. No. 13/170,345, filed Jun. 28, 2011, which is commonly assigned herewith and incorporated by reference herein.

A SWOSA engine in one implementation comprises an automating alerting framework which can provide highly accurate and efficient alerting for a wide variety of different monitored systems, including storage systems and other types of systems that are implemented using virtual infrastructure. It may be implemented using a plurality of modules, including, for example, a state monitor, a system configuration and history module, an alert generator, and an alert router. In such an arrangement, the state monitor is configured to send status data of the monitored system to the alert generator. The system configuration and history module provides information to the alert generator specifying an alert generation policy established for the monitored system. The alert generator is configured to process the status data from the state monitor in accordance with the alert generation policy specified by the system configuration and history module to generate at least one alert. The alert router is configured to determine optimal delivery characteristics for the generated alert and to deliver the alert in accordance with the optimal delivery characteristics.

The CIM server 112 of information processing system 100 may be part of a system monitored by a SWOSA engine of the type described above. Other SWOSA configurations may be used in other embodiments. Also, the use of CIM indications subscribed to and consumed by a SWOSA engine is merely an illustrative example, and such indications may be subscribed to and consumed by a wide variety of other types of systems in other embodiments. A given such indication source system may comprise the CIM server 112, or that CIM server may be implemented as a separate stand-alone element coupled between the source system and the processing device 102 or another system component.

Figure 2:
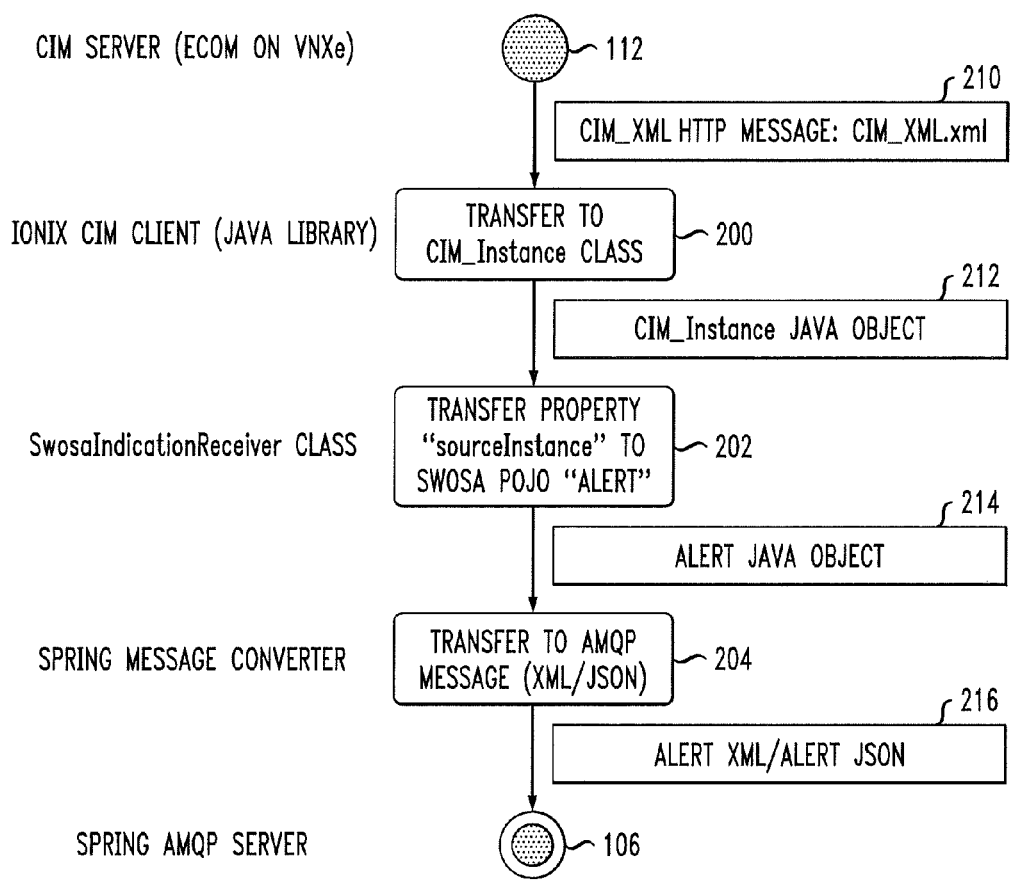
FIG. 2 is a flow diagram of a process for transformation of CIM indications to AMQP messages in the system of FIG. 1.

Referring now to the particular process steps of FIG. 2, in step 200, the CIM server 112, which may be implemented as an ECOM server on a VNXe platform, sends a CIM message 210 to the CIM client 110. The CIM message 210 more particularly comprises a CIM_XML HTTP message, although as noted above other types of CIM messages may be used in other embodiments.

In step 200, the CIM client 110, which may comprise an Ionix client implemented using a Java library, deserializes an indication associated with the CIM message 200 to a CIM instance class. More particularly, the indication is transferred to a CIM_Instance Java object denoted by reference numeral 212.

In step 202, the CIM_Instance Java object 212 is transformed to an alerting object, illustratively denoted as Alert Java object 214. This involves transferring a property referred to as "source instance" to a particular SWOSA plain old Java object (POJO) alert associated with a SWOSA Indication Receiver class.

In step 204, the Alert Java object 214 is serialized to an AMQP message that may be posted to the AMQP server 106. The transformed message comprises an Alert XML/JSON message 216. Step 204 in the present embodiment may be performed using a Spring message converter, and the AMQP server 106 may more particularly comprise a Spring RabbitMQ AMQP server, although numerous other implementations may be used.

The particular processing operations and other system functionality described in conjunction with the flow diagram of FIG. 2 are presented by way of illustrative example only, and should not be construed as limiting the scope of the invention in any way. Alternative embodiments can use other types of processing operations for transformation of CIM indications to AMQP messages. For example, the ordering of the process steps may be varied in other embodiments, or certain steps may be performed concurrently with one another rather than serially. Also, steps 200, 202 and 204 may be performed repeatedly for each of a series of CIM messages to be transformed. Additional or alternative process steps may be used in other embodiments.

It is also to be appreciated that message transformation functionality such as that described in conjunction with the flow diagram of FIG. 2 can be implemented at least in part in the form of one or more software programs stored in memory and executed by a processor of a processing device such as a computer or server. A memory or other storage device having such program code embodied therein is an example of what is more generally referred to herein as a "computer program product."

The embodiments described in conjunction with FIGS. 1 and 2 can provide a number of significant advantages relative to conventional practice. For example, such embodiments provide CIM indication support functionality to AMQP middleware, allowing the AMQP middleware to consume CIM-XML indication messages as well as other types of CIM messages from a CIM server. The CIM indication support functionality illustratively consumes CIM indication messages and publishes them through AMQP. CIM indications of any type, including those relating to system performance, system health and system configuration events, can be routed to any external service through AMQP message exchanges, thereby avoiding the need to rely on vendor-specific CIM implementations. This allows products to be seamlessly integrated with any third-party vendor applications that use AQMP as middleware, significantly reducing product integration costs.

Figure 3:
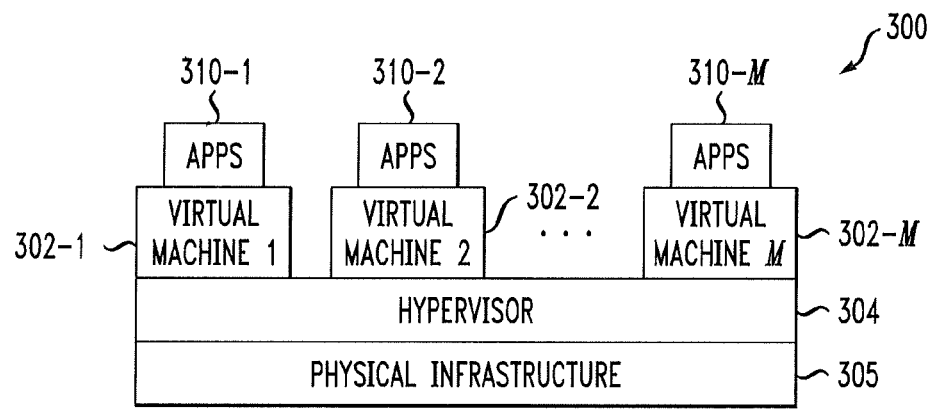
FIG. 3 shows one possible embodiment of cloud infrastructure that may be utilized to implement at least a portion of the FIG. 1 system.

Referring now to FIG. 3, portions of the IT infrastructure of information processing system 100 in this embodiment comprise cloud infrastructure 300. The cloud infrastructure 300 comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the processing device 102. Thus, the processing device 102 may comprise one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
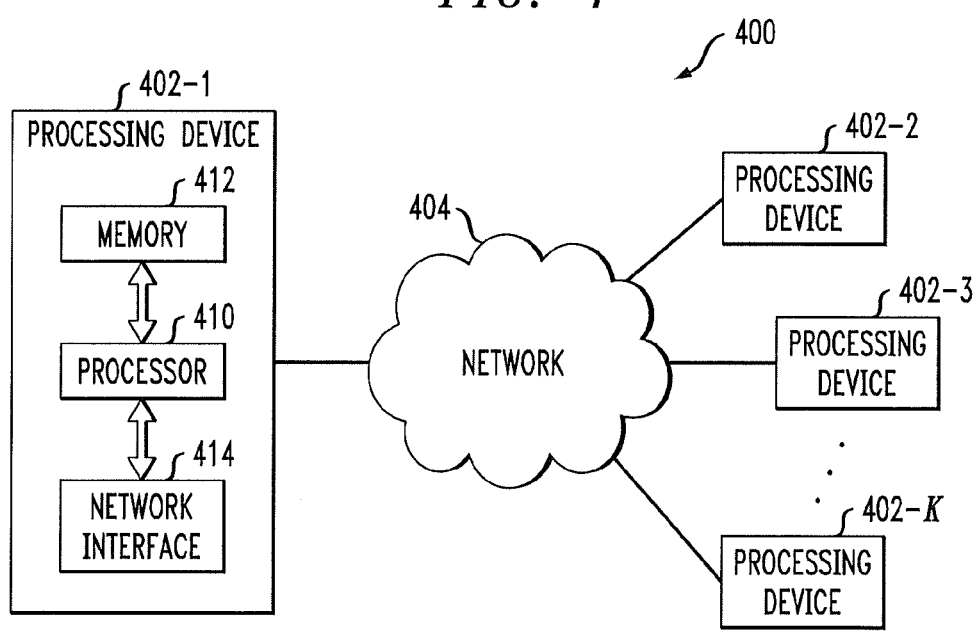
FIG. 4 shows one possible embodiment of a processing platform that may be utilized to implement at least a portion of the FIG. 1 system.

Multiple elements of information processing system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, message queuing protocols, and messaging formats. The particular process steps and component interactions used to transform a CIM message to a message in a designated message queuing protocol format may be varied in alternative embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
   receiving a common information model message comprising a common information model notification;
   transforming the common information model message to a message in a designated message queuing protocol format; and
   providing the transformed message to a message queuing protocol server;
   wherein the common information model notification is received in a common information model client from a common information model server responsive to an indication subscription from the common information model client;
   wherein the transforming step comprises:
      transforming information associated with the common information model message to a common information model instance object;
      transforming the common information model instance object to an alerting object; and
      transforming the alerting object to the message in the designated message queuing protocol format;
   wherein the step of transforming the common information model instance object to an alerting object comprises transferring at least one property from the common information model instance object to the alerting object; and
   wherein the receiving, transforming and providing steps are performed by a processing device of an information processing system, the processing device implementing a common information model transform module configured to receive the information associated with the common information model message, transform the received information to the message in the designated message queuing protocol format, and provide the message in the designated message queuing protocol format to the message queuing protocol server.

2. The method of claim 1 wherein the transforming step comprises transforming the common information model message into an AMQP message.

3. The method of claim 1 wherein the providing step comprises posting the transformed message to the message queuing protocol server.

4. The method of claim 1 further comprising the step of providing the transformed message to a message queuing protocol client.

5. The method of claim 1 wherein the common information model message comprises a CIM_XML HTTP message.

6. The method of claim 1 wherein the transformed message comprises an XML/JSON message.

7. The method of claim 1 wherein the common information model transform module is coupled to the common information model client and a message queuing protocol client, with both such clients being implemented on the processing device.

8. A computer program product comprising a non-transitory processor-readable storage medium having encoded therein executable code of one or more software programs, wherein the one or more software programs when executed by a processing device cause the processing device to:
   receive a common information model message comprising a common information model notification;
   transform the common information model message to a message in a designated message queuing protocol format; and
   provide the transformed message to a message queuing protocol server;
   wherein the common information model notification is received in a common information model client from a common information model server responsive to an indication subscription from the common information model client;
   wherein transforming the common information model message comprises:

transforming information associated with the common information model message to a common information model instance object;

transforming the common information model instance object to an alerting object; and transforming the alerting object to the message in the designated message queuing protocol format; and wherein transforming the common information model instance object to an alerting object comprises transferring at least one property from the common information model instance object to the alerting object; and wherein the processing device implements a common information model transform module configured to receive the information associated with the common information model message, transform the received information to the message in the designated message queuing protocol format, and provide the message in the designated message queuing protocol format to the message queuing protocol server.

9. The computer program product of claim 8 wherein providing the transformed message to the message queuing protocol server comprises posting the transformed message to the message queuing protocol server.

10. The computer program product of claim 8 further comprising providing the transformed message to a message queuing protocol client.

11. The computer program product of claim 8 wherein the common information model transform module is coupled to the common information model client and a message queuing protocol client, with both such clients being implemented on the processing device.

12. An apparatus comprising:
at least one processing device comprising a processor coupled to a memory;

wherein the processing device is configured to receive a common information model message comprising a common information model notification, to transform the common information model message to a message in a designated message queuing protocol format, and to provide the transformed message to a message queuing protocol server;

wherein the processing device further comprises a common information model client configured to receive the common information model notification from a common information model server responsive to an indication subscription from the common information model client;

wherein the processing device implements a common information model transform module configured to receive information associated with the common information model message in a common information model instance object, to transform the common information model instance object to an alerting object, and to transform the alerting object to the message in the designated message queuing protocol format;

wherein transforming the common information model instance object to an alerting object comprises transferring at least one property from the common information model instance object to the alerting object; and wherein the common information model transform module is configured to receive the information associated with the common information model message, transform the received information to the message in the designated message queuing protocol format, and provide the message in the designated message queuing protocol format to the message queuing protocol server.

13. The apparatus of claim 12 wherein the common information model transform module is coupled between the common information model client and a message queuing protocol client, with both such clients also being implemented on the processing device.

14. The apparatus of claim 12 wherein the processing device is implemented at least in part within virtual infrastructure of a cloud service provider.

15. An information processing system comprising the apparatus of claim 12.

16. The information processing system of claim 15 wherein the information technology infrastructure comprises at least one processing platform comprising a plurality of processing devices with each such processing device of the processing platform comprising a processor coupled to a memory.

17. The apparatus of claim 12 wherein providing the transformed message to the message queuing protocol server comprises posting the transformed message to the message queuing protocol server.

18. The apparatus of claim 12 wherein the transformed message is provided to a message queuing protocol client.

19. The apparatus of claim 12 wherein the common information model message comprises a CIM_XML HTTP message.

20. The apparatus of claim 12 wherein the transformed message comprises an XML/JSON message.

* * * * *